US011533230B2

(12) United States Patent
Nishizaki

(10) Patent No.: US 11,533,230 B2
(45) Date of Patent: Dec. 20, 2022

(54) COMPUTER-READABLE MEDIUM, RELAY DEVICE, TERMINAL MANAGEMENT DEVICE, AND SYSTEM FOR MANAGING TERMINAL DEVICES NOT DIRECTLY COMMUNICABLE WITH TERMINAL MANAGEMENT DEVICE

(71) Applicant: BROTHER KOGYO KABUSHIKI KAISHA, Nagoya (JP)

(72) Inventor: Takashi Nishizaki, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 41 days.

(21) Appl. No.: 17/036,416

(22) Filed: Sep. 29, 2020

(65) Prior Publication Data
US 2021/0099346 A1 Apr. 1, 2021

(30) Foreign Application Priority Data
Sep. 30, 2019 (JP) .............................. JP2019-179489

(51) Int. Cl.
*H04L 12/24* (2006.01)
*H04L 29/12* (2006.01)
(Continued)

(52) U.S. Cl.
CPC ...... *H04L 41/0853* (2013.01); *H04L 61/5007* (2022.05); *H04N 1/00344* (2013.01);
(Continued)

(58) Field of Classification Search
CPC ............. H04L 41/0853; H04L 61/2007; H04L 61/5007
See application file for complete search history.

(56) References Cited

U.S. PATENT DOCUMENTS

| 2016/0224291 A1* | 8/2016 | Ishino .................... G06F 3/1236 |
| 2017/0290078 A1* | 10/2017 | Suzuki .................. H04B 5/0031 |
| 2018/0278350 A1* | 9/2018 | Nishi ...................... H04W 8/30 |

FOREIGN PATENT DOCUMENTS

| JP | 2011101206 A | * | 5/2011 |
| JP | 2017-536598 A |   | 12/2017 |
| WO | WO 2016/048417 A1 |   | 3/2016 |

* cited by examiner

*Primary Examiner* — Christopher B Robinson
(74) *Attorney, Agent, or Firm* — Scully Scott Murphy and Presser

(57) ABSTRACT

A non-transitory computer-readable medium stores computer-readable program instructions executable by a processor of a relay device communicable with a terminal management device and one or more terminal devices. The program instructions are configured to, when executed by the processor, cause the relay device to perform unicast communication with each terminal device, thereby obtaining at least one of a device name and a vendor name of each terminal device as determination information, determine, based on the determination information, whether each terminal device is a supported terminal device to be managed by the terminal management device, and perform unicast communication with one or more individual terminal devices each determined to be the supported terminal device, thereby obtaining terminal information from each supported terminal device, the terminal information regarding each supported terminal device being collected by the terminal management device via the relay device.

16 Claims, 6 Drawing Sheets

(51) Int. Cl.
*H04L 41/0853* (2022.01)
*H04L 61/5007* (2022.01)
*H04N 1/327* (2006.01)
*H04N 1/00* (2006.01)
*H04N 1/32* (2006.01)

(52) U.S. Cl.
CPC ..... *H04N 1/32523* (2013.01); *H04N 1/32765* (2013.01); *H04N 2201/0055* (2013.01); *H04N 2201/0094* (2013.01)

FIG. 4

| Client | Devices | | | | |
|--------|---------|--|--|--|--|
| All | Client | Status | Model Name | Serial Number | IP Address | Last Update |
| Fukuoka | Nagoya | | AA-AAAAAA | ABCDEFG | 192.168.1.23 | 2019/08/08 16:00:58 |
| Nagoya | | | | | | |

Target Client: Fukuoka ▽  [Apply]

Polling Interval
☑ Search  120 min.(60-1440)
☑ Check Status  60 min.(20-1440)
Check Action  20 sec.(15-60)

Method:
● Broadcast
○ Broadcast + Unicast

Timeout: 5 sec.(3-10)
Loop: 3 times(1-5)
Unicast Range: 10.1.2.1 - 10.1.2.200   [Add]
10.1.2.100
10.1.2.254

COMPUTER-READABLE MEDIUM, RELAY DEVICE, TERMINAL MANAGEMENT DEVICE, AND SYSTEM FOR MANAGING TERMINAL DEVICES NOT DIRECTLY COMMUNICABLE WITH TERMINAL MANAGEMENT DEVICE

CROSS-REFERENCE TO RELATED APPLICATION

This application claims priority under 35 U.S.C. § 119 from Japanese Patent Application No. 2019-179489 filed on Sep. 30, 2019. The entire subject matter of the application is incorporated herein by reference.

BACKGROUND

Technical Field

Aspects of the present disclosure are related to a non-transitory computer-readable medium, a relay device, a terminal management device, and a system for managing one or more terminal devices unable to communicate directly with the terminal management device.

Related Art

A technique for managing a plurality of terminal devices by a terminal management device has been known.

SUMMARY

However, the known technology is based on an assumption that the terminal management device is configured to communicate with each of the plurality of terminal devices via a network. Therefore, for instance, when a terminal device exists on a local network such that the terminal management device is not allowed to communicate directly with the terminal device thereon, the terminal management device is unable to collect information from the terminal device at desired timing.

Aspects of the present disclosure are advantageous to provide one or more improved techniques that enable a terminal management device to manage one or more terminal devices even in such an environment that the terminal management device is unable to communicate directly with the one or more terminal device.

According to aspects of the present disclosure, a non-transitory computer-readable medium is provided, which stores computer-readable program instructions executable by a processor of a relay device communicable with a terminal management device and one or more terminal devices. The program instructions are configured to, when executed by the processor, cause the relay device to perform unicast communication with each of the one or more terminal devices, thereby obtaining at least one of a device name and a vendor name of each terminal device as determination information, determine, based on the obtained determination information, whether each of the one or more terminal devices is a supported terminal device to be managed by the terminal management device, and perform unicast communication with one or more individual terminal devices each determined to be the supported terminal device, thereby obtaining terminal information from each supported terminal device, the terminal information regarding each supported terminal device being collected by the terminal management device via the relay device.

According to aspects of the present disclosure, further provided is a non-transitory computer-readable medium storing computer-readable program instructions executable by a processor of a terminal management device communicable with a relay device. The relay device is communicable with a plurality of terminal devices. The program instructions are configured to, when executed by the processor, cause the terminal management device to provide a user interface configured to receive input of particular information for specifying a plurality of IP addresses assigned to the plurality of terminal devices, and obtain, via the user interface, the particular information for specifying the plurality of IP addresses. The relay device is configured to perform unicast communication with each of the plurality of terminal devices using the plurality of IP addresses specified by the particular information, thereby obtaining at least one of a device name and a vendor name of each terminal device as determination information, determine, based on the obtained determination information, whether each of the plurality of terminal devices is a supported terminal device to be managed by the terminal management device, and perform unicast communication with one or more individual terminal devices each determined to be the supported terminal device, thereby obtaining terminal information from each supported terminal device, the terminal information regarding each supported terminal device being collected by the terminal management device via the relay device.

According to aspects of the present disclosure, further provided is a relay device including a communication interface configured to communicate with a terminal management device and one or more terminal devices, and a controller. The controller is configured to perform unicast communication with each of the one or more terminal devices, thereby obtaining at least one of a device name and a vendor name of each terminal device as determination information, determine, based on the obtained determination information, whether each of the one or more terminal devices is a supported terminal device to be managed by the terminal management device, and perform unicast communication with one or more individual terminal devices each determined to be the supported terminal device, thereby obtaining terminal information from each supported terminal device, the terminal information regarding each supported terminal device being collected by the terminal management device via the relay device.

According to aspects of the present disclosure, further provided is a terminal management device including a communication interface configured to communicate with a relay device, the relay device being communicable with a plurality of terminal devices, and a controller. The controller is configured to provide a user interface configured to receive input of particular information for specifying a plurality of IP addresses assigned to the plurality of terminal devices, and obtain, via the user interface, the particular information for specifying the plurality of IP addresses. The relay device is configured to perform unicast communication with each of the plurality of terminal devices using the plurality of IP addresses specified by the particular information, thereby obtaining at least one of a device name and a vendor name of each terminal device as determination information, determine, based on the obtained determination information, whether each of the plurality of terminal devices is a supported terminal device to be managed by the terminal management device, and perform unicast communication with one or more individual terminal devices each determined to be the supported terminal device, thereby obtaining terminal information from each supported terminal device, the terminal information regarding each supported terminal device being collected by the terminal management device via the relay device.

According to aspects of the present disclosure, further provided is a system including one or more terminal devices, a terminal management device, and a relay device. The relay device includes a communication interface configured to communicate with the terminal management device and the one or more terminal devices, and a controller. The controller is configured to perform unicast communication with each of the one or more terminal devices, thereby obtaining at least one of a device name and a vendor name of each terminal device as determination information, determine, based on the obtained determination information, whether each of the one or more terminal devices is a supported terminal device to be managed by the terminal management device, and perform unicast communication with one or more individual terminal devices each determined to be the supported terminal device, thereby obtaining terminal information from each supported terminal device, the terminal information regarding each supported terminal device being collected by the terminal management device via the relay device.

BRIEF DESCRIPTION OF THE ACCOMPANYING DRAWINGS

FIG. 4 shows an example of an input screen displayed on the terminal management device, in the illustrative embodiment according to one or more aspects of the present disclosure.

DETAILED DESCRIPTION

It is noted that various connections are set forth between elements in the following description. It is noted that these connections in general and, unless specified otherwise, may be direct or indirect and that this specification is not intended to be limiting in this respect. Aspects of the present disclosure may be implemented on circuits (such as application specific integrated circuits) or in computer software as programs storable on computer-readable media including but not limited to RAMs, ROMs, flash memories, EEPROMs, CD-media, DVD-media, temporary storage, hard disk drives, floppy drives, permanent storage, and the like.

Hereinafter, an illustrative embodiment according to aspects of the present disclosure will be described with reference to the accompanying drawings.

(1) Configuration of Terminal Management System

Figure 1:
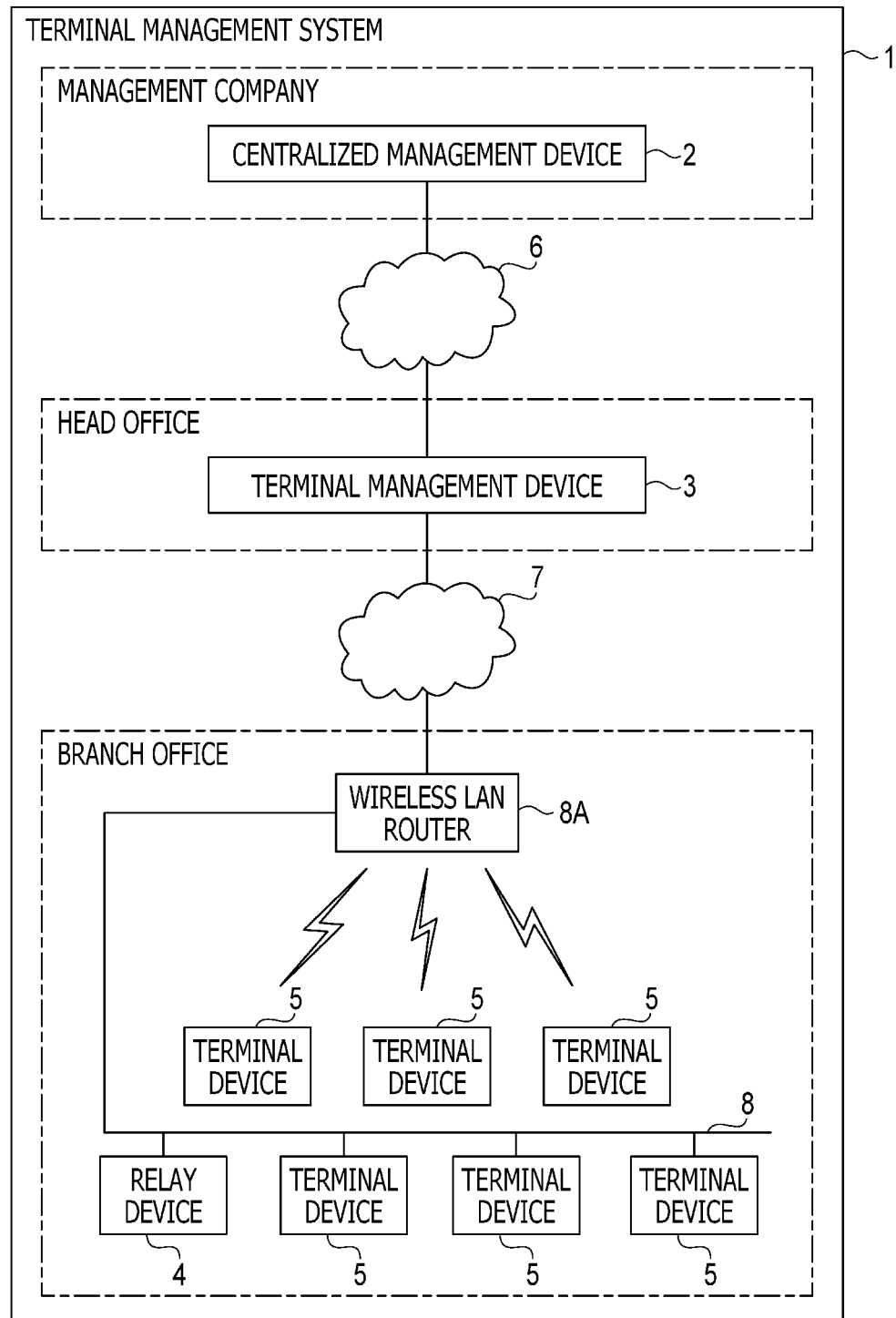
FIG. 1 is a block diagram schematically showing a configuration of a terminal management system in an illustrative embodiment according to one or more aspects of the present disclosure.

As shown in FIG. 1, a terminal management system 1 includes a centralized management device 2, a terminal management device 3, a relay device 4, and terminal devices 5. Further, as shown in FIG. 1, the centralized management device 2 and the terminal management device 3 are configured to communicate with each other via a WAN ("WAN" is an abbreviation for "Wide Area Network") 6. The terminal management device 3 and the relay device 4 are configured to communicate with each other via a WAN 7 and a LAN ("LAN" is an abbreviation for "Local Area Network") 8. The relay device 4 and the terminal devices 5 are configured to communicate with each other via the LAN 8. The WAN 6 and the WAN 7 may be the same network or may be separate networks. In the illustrative embodiment, both of the WAN 6 and the WAN 7 use the Internet.

The WAN 7 and the LAN 8 are connected with each other via a wireless LAN router 8A. The wireless LAN router 8A is a device having both a router function and a wireless LAN access point function. In addition, the wireless LAN router 8A has a firewall function and is configured to prevent unauthorized access from the side of the WAN 7 to the side of the LAN 8. The wireless LAN router 8A is connected with a LAN cable. Thereby, the LAN 8 is configured to serve as both a wired LAN and a wireless LAN.

The terminal devices 5 may include one or more terminal devices 5 connectable with the wireless LAN and one or more terminal devices 5 connectable with the wired LAN. In the illustrative embodiment, it is assumed that each of the one or more terminal devices 5 connectable with the wireless LAN is a printer (hereinafter, which may be referred to as a "mobile printer") that is used in conjunction with a mobile terminal. In this case, each terminal device 5 connectable with the wireless LAN establishes a communication link with the wireless LAN router 8A when located within a communicable range of the wireless LAN router 8A, thereby being incorporated into the terminal management system 1. Examples of the one or more terminal devices 5 connectable with the wired LAN may include, but are not limited to, printers and MFPs ("MFP" is an abbreviation for "Multi-Function Peripheral") that are incompatible with the wireless LAN.

For instance, in the terminal management system 1 of the illustrative embodiment, the centralized management device 2 may collect information from the terminal devices 5, and may remotely control the terminal devices 5 to perform processes such as test printing, rebooting, and shutting down. Examples of a location where each device included in the terminal management system 1 is installed may include, but are not limited to, a case in which the terminal management device 3 is installed at a head office of Company A, and the relay device 4 and the terminal devices 5 are installed at a branch office of Company A.

In this case, information (hereinafter, which may be referred to as "terminal information") regarding each of the plurality of terminal devices 5 operated at the branch office of Company A is collected by the terminal management device 3 installed at the head office of Company A. The terminal information collected by the terminal management device 3 is collected and managed by the centralized management device 2, for instance, which is operated by a management company different from Company A. However, the centralized management device 2 may be operated by Company A. Thus, it is arbitrary whether or not Company A and the management company are separate companies.

Although the following features are not shown in FIG. 1, there may be one or more terminal management devices 3 other than the aforementioned terminal management device 3. Namely, the terminal management system 1 may include a plurality of terminal management devices 3. In this case, the plurality of terminal management devices 3 may be configured to be managed by the single centralized management device 2. For instance, a terminal management device 3 may be installed in each of Companies B, C, D, . . . different from Company A, and those plurality of terminal management devices 3 may be managed by the single centralized management device 2 installed in the management company.

Further, although the following features are not shown in FIG. 1, there may be one or more relay devices 4 other than the aforementioned relay device 4. Namely, the terminal management system 1 may include a plurality of relay devices 4. In this case, the plurality of relay devices 4 may be configured to be managed by the single terminal management device 3. For instance, when Company A has a plurality of branch offices, a relay device 4 may be installed at each of the branch offices, and those plurality of relay devices 4 may be managed by the single terminal management device 3 installed at the head office.

Figure 2A:
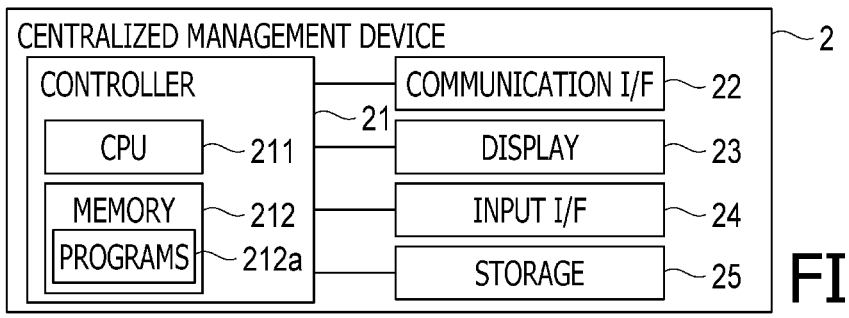
FIG. 2A is a block diagram schematically showing a configuration of a centralized management device included in the terminal management system in the illustrative embodiment according to one or more aspects of the present disclosure.

As shown in FIG. 2A, the centralized management device 2 includes a controller 21, a communication I/F ("I/F" is an abbreviation for "interface") 22, a display 23, an input I/F 24, and a storage 25. The controller 21 includes a CPU 211 and a memory 212. The CPU 211 performs various kinds of processing and control in accordance with software such as programs 212a stored in the memory 212, thereby realizing various functions of the centralized management device 2. However, the various functions of the centralized management device 2 are not limited to functions realized by the CPU 211 executing the software such as the programs 212a. Some or all of the various functions of the centralized management device 2 may be realized by one or more hardware elements.

The memory 212 includes one or more semiconductor memories (e.g., a ROM, a RAM, an NVRAM, and a flash memory) that are non-transitory substantive storage media. The memory 212 stores the software (e.g., the programs 212a) and data. The communication I/F 22 includes a network interface controller configured to connect with the WAN 6 and perform communication via the WAN 6. The display 23 is a display device (e.g., a liquid crystal display or an organic EL display) and is configured to display various images. The input I/F 24 includes an input device configured to receive various input operations, and an input controller configured to process inputs from the input device. The storage 25 includes one or more auxiliary storage devices such as an HDD ("HDD" is an abbreviation for "Hard Disk Drive") and an SSD ("SSD" is an abbreviation for "Solid State Drive").

Figure 2B:
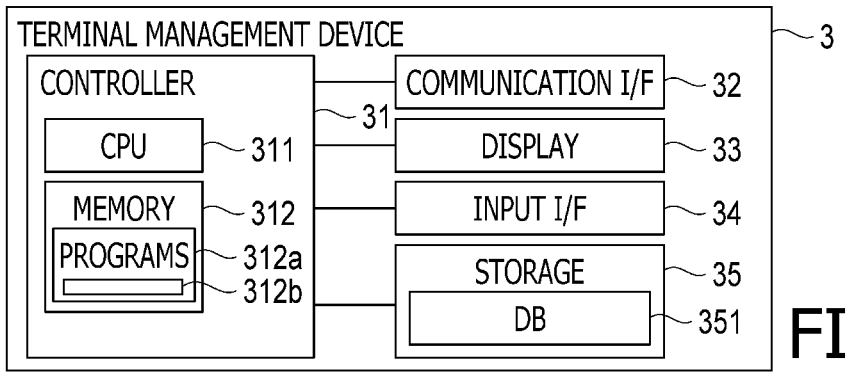
FIG. 2B is a block diagram schematically showing a configuration of a terminal management device included in the terminal management system in the illustrative embodiment according to one or more aspects of the present disclosure.

As shown in FIG. 2B, the terminal management device 3 includes a controller 31, a communication I/F 32, a display 33, an input I/F 34, and a storage 35. The controller 31 includes a CPU 31 and a memory 312. The CPU 311 performs various kinds of processing and control in accordance with software such as programs 312a stored in the memory 312, thereby realizing various functions of the terminal management device 3. However, the various functions of the terminal management device 3 are not limited to functions realized by the CPU 311 executing the software such as the programs 312a. Some or all of the various functions of the terminal management device 3 may be realized by one or more hardware elements.

The memory 312 includes one or more semiconductor memories (e.g., a ROM, a RAM, an NVRAM, and a flash memory) that are non-transitory substantive storage media. The memory 312 stores the software (e.g., the programs 312a) and data. The communication I/F 32 includes a network interface controller configured to connect with the WAN 6 and perform communication via the WAN 6. In the illustrative embodiment, the WAN 6 and the WAN 7 are the same network. Namely, the communication I/F 32 is configured to connect with the WAN 7 and perform communication via the WAN 7. The display 33 includes a display device (e.g., a liquid crystal display or an organic EL display), and is configured to display various images. The input I/F 34 includes an input device configured to receive various input operations, and an input controller configured to process inputs from the input device. The storage 35 includes one or more auxiliary storage devices such as an HDD and an SSD. The storage 35 contains a database 351 (hereinafter referred to as the "DB 351"). When the terminal management device 3 performs below-mentioned processes, various types of data are registered into the DB 351, updated, and deleted therefrom.

Figure 2C:
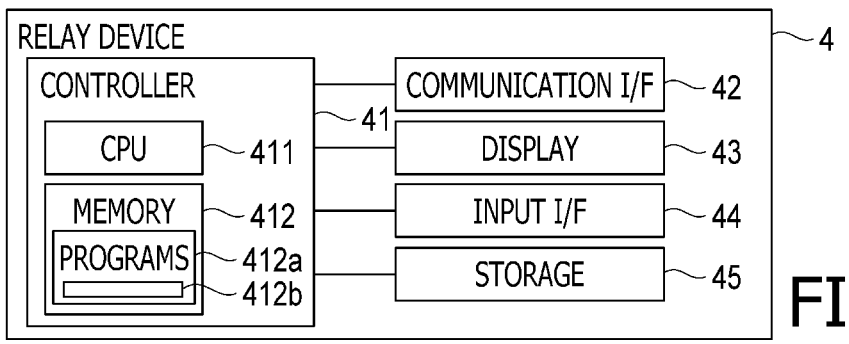
FIG. 2C is a block diagram schematically showing a configuration of a relay device included in the terminal management system in the illustrative embodiment according to one or more aspects of the present disclosure.

As shown in FIG. 2C, the relay device 4 includes a controller 41, a communication I/F 42, a display 43, an input I/F 44, and a storage 45. The controller 41 includes a CPU 411 and a memory 412. The CPU 411 performs various kinds of processing and control in accordance with software such as programs 412a stored in the memory 412, thereby realizing various functions of the relay device 4. However, the various functions of the relay device 4 are not limited to functions realized by the CPU 411 executing the software such as the programs 412a. Some or all of the various functions of the relay device 4 may be realized by one or more hardware elements.

The memory 412 includes one or more semiconductor memories (e.g., a ROM, a RAM, an NVRAM, and a flash memory) that are non-transitory substantive storage media. The memory 412 stores the software (e.g., the programs 412a) and data. The communication I/F 42 includes a network interface controller configured to connect with the WAN 7 and perform communication via the WAN 7, and a network interface controller configured to connect with the WAN 8 and perform communication via the WAN 8. The display 43 includes a display device (e.g., a liquid crystal display or an organic EL display) and is configured to display various images. The input I/F 44 includes an input device configured to receive various input operations, and an input controller configured to process inputs from the input device. The storage 45 includes one or more auxiliary storage devices such as an HDD and an SSD.

Figure 2D:
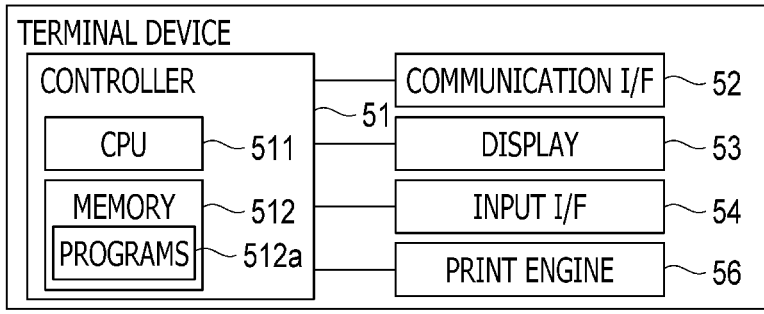
FIG. 2D is a block diagram schematically showing a configuration of a terminal device included in the terminal management system in the illustrative embodiment according to one or more aspects of the present disclosure.

As shown in FIG. 2D, each terminal device 5 includes a controller 51, a communication I/F 52, a display 53, an input I/F 54, and a print engine 56. The controller 51 includes a CPU 511 and a memory 512. The CPU 511 performs various kinds of processing and control in accordance with software such as programs 512a stored in the memory 512, thereby realizing various functions of each terminal device 5. However, the various functions of each terminal device 5 are not limited to functions realized by the CPU 511 executing the software such as the programs 512a. Some or all of the various functions of each terminal device 5 may be realized by one or more hardware elements.

The memory 512 includes one or more semiconductor memories (e.g., a ROM, a RAM, an NVRAM, and a flash memory) that are non-transitory substantive storage media. The memory 512 stores software (e.g., programs 512a) and data. The communication I/F 52 includes a network interface controller configured to connect with the LAN 8 and perform communication via the LAN 8. For instance, when one of the terminal devices 5 is a wireless LAN-compatible mobile printer, the communication I/F 52 thereof includes a network interface controller corresponding to wireless LAN standards. Further, for instance, when one of the terminal devices 5 is a wired LAN-compatible printer, the communication I/F 52 thereof includes a network interface controller corresponding to wired LAN standards.

The display 53 includes a display device (e.g., a liquid crystal display or an organic EL display) and is configured to display various images. The input I/F 54 includes an input device configured to receive various input operations and an input controller configured to process inputs from the input device. The print engine 56 includes a thermal printing mechanism, and is configured to perform printing on heat-sensitive roll paper. However, for instance, the print engine 56 may be configured to perform printing on cut paper. In another instance, the print engine 56 may be configured to perform printing in a known recording method (e.g., an inkjet method) other than the thermal method.

(2) Overview of Operations by Terminal Management System

In the illustrative embodiment, the terminal management system 1 operates as follows. When a relay processing program 412b is installed into a computer and executed, the relay processing program 412b causes the computer to perform processing as the relay device 4. It is noted that the relay processing program 412b may be included in the programs 412a stored in the memory 412. At the time of starting the relay processing program 412b, the relay device 4 accesses the terminal management device 3 via the WAN 7 and transmits a request for registration of the relay device 4 to the terminal management device 3. When receiving the request for registration of the relay device 4 from the relay device 4, the terminal management device 3 determines whether the relay device 4 has already been registered in the DB 351. When determining that the relay device 4 has not yet been registered in the DB 351, the terminal management device 3 registers information regarding the relay device 4 into the DB 351.

In addition, the terminal management device 3 registers, into the DB 351, action information representing that a periodic process should be performed as an action to be taken by the relay device 4. The action information is registered into the DB 351 as periodic information. The periodic information remains registered in the DB 351 without being deleted unless the periodic information is instructed to be deleted by a command transmitted from the centralized management device 2 to the terminal management device 3 or a command input by a user operation at the terminal management device 3. When the relay device 4 begins to operate, the relay device 4 performs the periodic process and periodically inquires of the terminal management device 3 whether there is an action to be taken by the relay device 4.

When action information regarding an action to be taken by the relay device 4 is registered in the DB 351, the terminal management device 3 transmits the action information to the relay device 4 as a reply to the inquiry. At the time of receiving an initial inquiry from the relay device 4, the terminal management device 3 transmits, to the relay device 4, the action information representing that the aforementioned periodic process should be performed by the relay device 4. The relay device 4 obtains the action information representing that the periodic process should be performed, and thereafter repeatedly performs the periodic process each time an interval elapses, according to a setting of the interval contained in the action information.

The relay device 4 searches for the terminal devices 5 to be managed, on the LAN 8, using SNMP ("SNMP" is an abbreviation for "Simple Network Management Protocol"). When the terminal devices 5 to be managed are found, the relay device 4 transmits a request for registration of the terminal information regarding the terminal devices 5 to the terminal management device 3. When receiving the request for registration of the terminal information, the terminal management device 3 registers the terminal information into the DB 351.

When a command transmitted from the centralized management device 2 to the terminal management device 3 or input by a user operation at the terminal management device 3 is a command to instruct a terminal device 5 to perform test printing or reboot, the terminal management device 3 registers action information corresponding to the command to the terminal device 5 into the DB 351. The action information is registered in the DB 351 as one-shot information. The one-shot information is information that is deleted from the DB 351 after a process corresponding to the one-shot information has been performed by the relay device 4 or a terminal device 5.

As described above, the relay device 4 periodically inquires of the terminal management device 3 whether there is an action to be taken by the relay device 4. When the aforementioned one-shot information is registered in the DB 351, the terminal management device 3 transmits the action information (i.e., the one-shot information) to the relay device 4 as a reply to the inquiry. The relay device 4 transmits a command to the terminal device 5 based on the action information received from the terminal management device 3. Thereby, the terminal device 5 performs a process such as test printing or rebooting. After execution of such a process by the terminal device 5, the relay device 4 transmits to the terminal management device 3 an execution result and an action deletion request that denotes completion of the action at the terminal device 5. The terminal management device 3 deletes the information corresponding to the action deletion request from the DB 351.

If the user wishes to change the interval of the periodic process to be periodically performed by the relay device 4, action information to provide an instruction to change the interval of the periodic process may be registered into the DB 351 by a command transmitted from the centralized management device 2 to the terminal management device 3 or by a command input by a user operation at the terminal management device 3. The action information is registered into the DB 351 as one-shot information.

As described above, the relay device 4 periodically inquires of the terminal management device 3 whether there is an action to be taken by the relay device 4. When the aforementioned one-shot information is registered in the DB 351, the terminal management device 3 may transmit the action information (i.e., the one-shot information) to the relay device 4 as a reply to the inquiry. The relay device 4 changes the interval of the periodic process that the relay device 4 is periodically performing, based on the action information received from the terminal management device 3. After having changed the interval, the relay device 4 transmits to the terminal management device 3 an execution result and an action deletion request that denotes completion of the action at the relay device 4. The terminal management device 3 deletes the information corresponding to the action deletion request from the DB 351. The relay device 4, which has received the action information to provide the instruction to change the interval, resumes the periodic process at the changed interval.

(3) Setting Change Process by Terminal Management Device

Next, a setting change process to be performed by the terminal management device 3 will be described. In the terminal management unit 3, the CPU 311 performs processing according to a terminal management processing program 312*b* stored in the memory 312. The processing performed according to the terminal management processing program 312*b* includes the setting change process as shown in FIG. 3.

Figure 3:
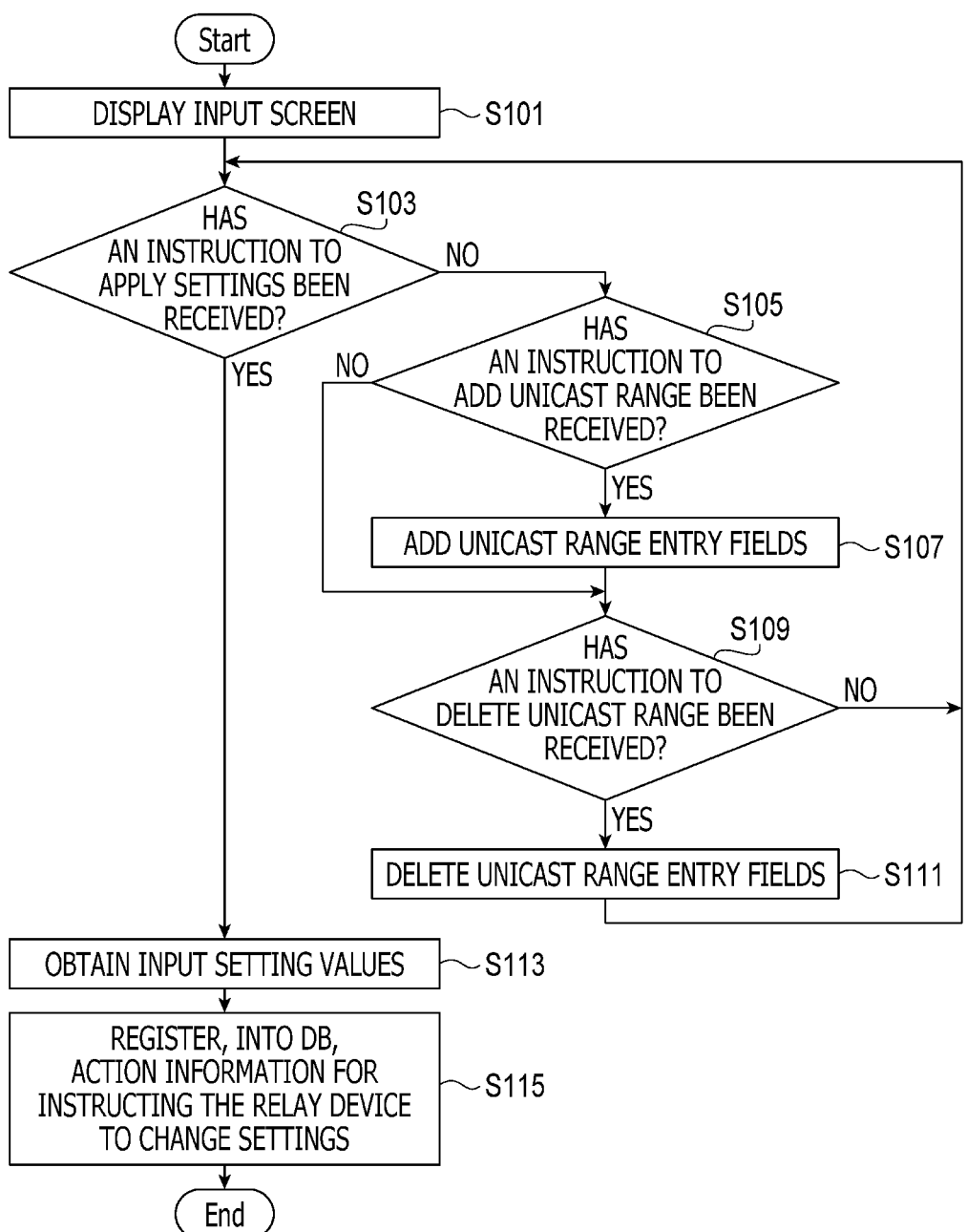
FIG. 3 is a flowchart showing a procedure of a setting change process to be performed by the terminal management device, in the illustrative embodiment according to one or more aspects of the present disclosure.

When the setting change process shown in FIG. 3 is started, the terminal management device 3 displays on the display 33 an input screen 61 as shown in FIG. 4 (S101). The input screen 61 is a screen on which parameters corresponding to search conditions are input when the relay device 4 is instructed to search for the terminal devices 5 by the terminal management device 3. As shown in FIG. 4, the input screen 61 includes a plurality of elements arranged thereon, such as a target client selecting field 63, an "Apply" button 65, a polling interval setting field 67, a search mode setting field 69, a timeout setting field 71, a search attempt frequency setting field 73, an "Add" button 75, unicast range entry fields 77, a client list display field 81, and a device list display field 83.

The target client selecting field 63 is for selecting a relay device 4 to which a group of parameters input via the input screen 61 is to be applied from among one or more relay devices 4 included in the terminal management system 1.

In the example of the input screen 61 shown in FIG. 4, the terminal management system 1 includes two relay devices 4 respectively associated with "Fukuoka" and "Nagoya" in the client list display field 81. In the target client selecting field 63, the user is allowed to select to which one of the two relay devices 4 the aforementioned group of parameters is to be applied. It is noted that the user may select "All" in the target client selecting field 63. In this case, the group of parameters is applied to all of the two relay devices 4.

The "Apply" button 65 is a button to be pressed to provide an instruction to apply the aforementioned group of parameters. It is noted that examples of the "pressing" operation may include, but are not limited to, a tapping operation to a touch panel, a clicking operation with a pointing device, and a keyboard operation to a shortcut key associated with the "pressing" operation. The polling interval setting field 67 is for setting whether the relay device 4 (selected as the target client) periodically searches for terminal devices 5. Further, when the relay device 4 is set to periodically search for terminal devices 5, the polling interval setting field 67 is for setting how many minutes the search is performed at intervals of. Further, the polling interval setting field 67 is for setting whether the relay device 4 checks a status of each found terminal device 5. Further, when the relay device 4 is set to check the status of each found terminal device 5, the polling interval setting field 67 is for setting how many minutes the check is performed at intervals of. Further, the polling interval setting field 67 is for setting how many seconds the relay device 4 checks whether there is action information on an action to be taken registered on the terminal management device 3 at intervals of.

The search mode setting field 69 is for setting a normal mode (shown as "Broadcast" in FIG. 4) or an enhanced mode (shown as "Broadcast+Unicast" in FIG. 4) as a search mode for the relay device 4 to search for terminal devices 5. The timeout setting field 71 is an entry field for inputting a period of timeout. When the relay device 4 obtains no information in searching for terminal devices 5 even after a lapse of the period of timeout, the relay device 4 is caused to abort the obtainment of information. The search attempt frequency setting field 73 is for inputting an upper limit of the number of attempts to search terminal devices 5. When the relay device 4 obtains no information even though the relay device 4 repeatedly attempts to obtain information from terminal devices 5 in searching for terminal devices 5 until the number of the attempts reaches the upper limit, the relay device 4 is caused to abort the obtainment of information.

The "Add" button 75 is for adding unicast range entry fields 77. In an example shown in FIG. 4, the input screen 61 includes two sets of unicast range entry fields 77. However, by pressing the "Add" button 75, it is possible to add further unicast range entry fields 77. Each set of unicast range entry fields 77 is for inputting an upper limit and a lower limit of a range of IP addresses to be searched when the relay device 4 searches for terminal devices 5.

The client list display field 81 is for displaying a list of the relay devices 4 included in the terminal management system 1. The device list display field 83 is for displaying a list of terminal devices 5 under the control of the relay device 4 selected in the client list display field 81. In the illustrative embodiment, the terminal management device 3 and the relay device 4 are in a relationship of a server and a client. Therefore, the relay device 4 is displayed in the aforementioned client list display field 81. When "All" is selected in the client list display field 81, all the terminal devices 5 under the control of each of all the relay devices 4 included in the terminal management system 1 are displayed in the device list display field 83.

After S101, the terminal management device 3 determines whether an instruction to apply the settings has been received (S103). Specifically, in S103, the terminal management device 3 determines whether the aforementioned "Apply" button 65 has been pressed. When determining that an instruction to apply the settings has not been received (S103: No), the terminal management device 3 determines whether an instruction to add a unicast range has been received (S105). Specifically, in S105, the terminal management device 3 determines whether the aforementioned "Add" button 75 has been pressed.

When determining that an instruction to add a unicast range has been received (S105: Yes), the terminal management device 3 adds another set of unicast range entry fields 77 (S107). After completion of S107, the terminal management device 3 goes to S109. Meanwhile, when determining that an instruction to add a unicast range has not been received (S105: No), the terminal management device 3 goes to S109 without executing S107.

In S109, the terminal management device 3 determines whether an instruction to delete a unicast range has been received (S109). Specifically, in S109, the terminal management device 3 determines whether an operation of deleting setting values in a specified set of unicast range entry fields 77 has been performed. When determining that an instruction to delete a unicast range has been received (S109: Yes), the terminal management device 3 deletes the specified set of unicast range entry fields 77 (S111). After completion of S111, the terminal management device 3 goes back to S103. Meanwhile, when determining that an instruction to delete a unicast range has not been received (S109: No), the terminal management device 3 return to S103 without executing S111. Thus, while making a negative determination in S103 (S103: No), the terminal management device 3 repeatedly performs a process of S103 to S111.

When determining that an instruction to apply the settings has been received (S103: Yes) while the process of S103 to S111 is repeatedly performed, the terminal management device 3 obtains the setting values entered on the input screen 61 (S113). Subsequently, the terminal management device 3 registers, into the DB 351, action information for instructing the relay device 4 to change the settings (S115). After completion of S115, the terminal management device 3 terminates the setting change process shown in FIG. 3. When receiving an inquiry from the relay device 4, the terminal management device 3 transmits the action information registered in the DB 351 in reply to the inquiry. Thus, the setting values entered via the input screen 61 are transmitted to and used by the relay device 4.

(4) Terminal Device Search Process by Relay Device

Next, a terminal device search process to be performed by a relay device 4 will be described. Each relay device 4 is configured such that the CPU 411 thereof performs processes according to the relay processing program 412b stored in the memory 412. The processes executable according to the relay processing program 412b include the terminal device search process as shown in FIGS. 5A and 5B.

Figure 5A:
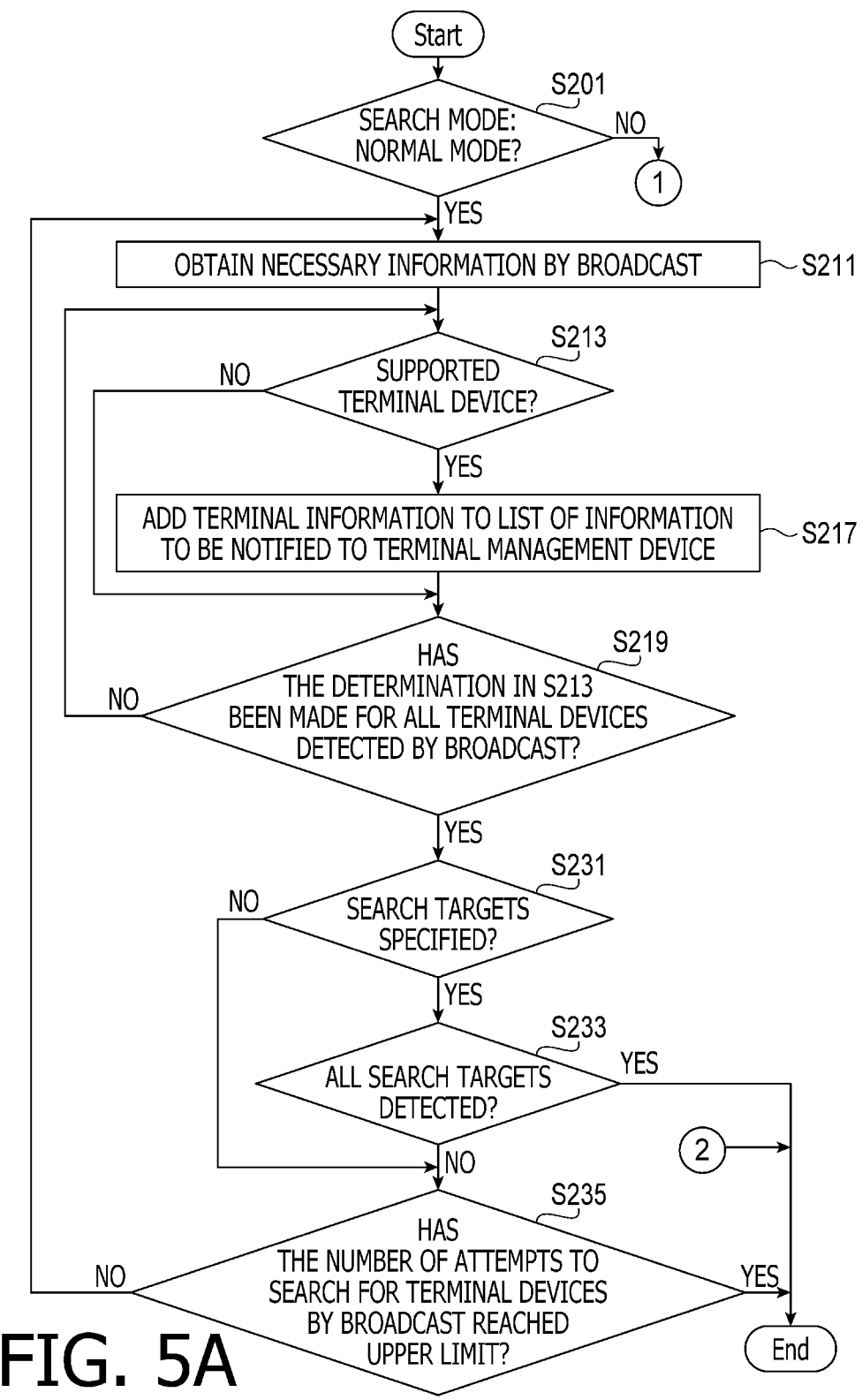
FIGS. 5A and 5B are flowcharts showing a procedure of a terminal device search process to be performed by the relay device, in the illustrative embodiment according to one or more aspects of the present disclosure.
Figure 5B:
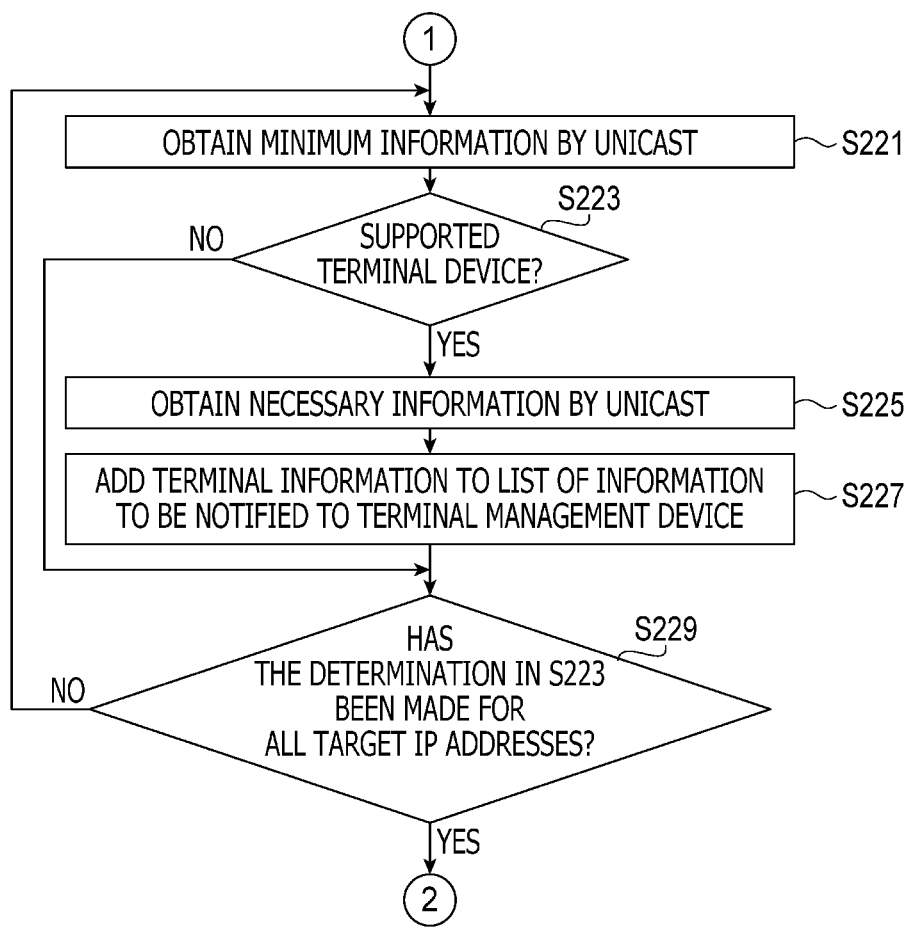

When the terminal device search process shown in FIGS. 5A and 5B is started, the relay device 4 determines whether the search mode is the normal mode (S201). Specifically, in S201, the relay device 4 determines whether the search mode specified by the user is the normal mode or the enhanced mode. The search mode specified by the user is a mode set in the search mode setting field 69 on the input screen 61 and transmitted from the terminal management device 3 to the relay device 4. The mode is stored in a non-volatile memory included in the memory 412 of the relay device 4.

When determining that the search mode is the normal mode (S201: Yes), the relay device 4 obtains necessary information by broadcast (S211). Specifically, in S211, the relay device 4 sends a request for terminal information to terminal devices 5 in a broadcasting manner. In S211, the relay device 4 makes one or more attempts to broadcast the request for terminal information with reference to the period of timeout as set in the timeout setting field 71 and the upper limit of the number of attempts to search terminal devices 5 as set in the search attempt frequency setting field 73.

After completion of S211, the relay device 4 sets, as processing-target terminal information, each piece of terminal information obtained as a reply to the broadcast, and determines whether each terminal device 5 that has transmitted a corresponding piece of the processing-target terminal information is a supported terminal device 5 (S213). Specifically, in S213, based on a device name and/or a vendor name contained in the terminal information regarding each terminal device 5, the relay device 4 determines whether the individual terminal devices 5 that have transmitted the processing-target terminal information are supported terminal devices 5, by referring to a list of terminal devices 5 to be recognized as supported terminal devices 5.

It is noted that the supported terminal devices 5 are terminal devices 5 to be managed by the terminal management device 3 via the relay device 4.

When determining that an individual terminal device 5 that has transmitted a corresponding piece of the processing-target terminal information is a supported terminal device 5 (S213: Yes), the relay device 4 adds the terminal information of the terminal device 5 to a list of information to be notified to the terminal management device (S217). After completion of S217, the relay device 4 goes to S219. Meanwhile, when determining that the individual terminal device 5 is not a supported terminal device 5 (S213: Yes), the relay device 4 goes to S219 without executing S217.

In S219, the relay device 4 determines whether the determination in S213 has been made for all of the terminal devices 5 detected by the broadcast (S219). When determining that the determination in S213 has not been made for all of the terminal devices 5 (S219: No), the relay device 4 goes back to S213. Thus, the determination in S213 is repeatedly made for each of all the terminal devices 5 detected by the broadcast.

On the other hand, when determining that the determination in S213 has been made for all of the terminal devices 5 (S219: Yes), the relay device 4 determines whether search targets are specified (S231). When determining that search targets are specified (S231: Yes), the relay device 4 determines whether all the search targets have been detected (S233). When determining that all the search targets have been detected (S233: Yes), the relay device 4 terminates the terminal device search process shown in FIGS. 5A and 5B.

When determining that all the search targets have not been detected (S233: No), the relay device 4 goes to S235. When determining that search targets are not specified (S231: No), the relay device 4 goes to S235 without executing S233. In S235, the relay device 4 determines whether the number of attempts to search terminal devices 4 by the broadcast has reached the upper limit (S235). When determining that the number of attempts to search terminal devices 4 by the broadcast has not reached the upper limit (S235: No), the relay device 4 goes back to S211. Thereby, the process of S211 and the following steps is executed again. Meanwhile, when determining that the number of attempts to search terminal devices 4 by the broadcast has reached the upper limit (S235: Yes), the relay device 4 terminates the terminal device search process shown in FIGS. 5A and 5B.

When determining that the search mode is not the normal mode (S201: No), the relay device 4 determines that the search mode is set to the enhanced mode. Therefore, in this case, the relay device 4 obtains minimal information by unicast (S221). In S221, the relay device 4 sends a request for determination information to a terminal device 5 by unicast. The information, which is selected as the "determination information" referred to here, is usable for determining whether the terminal device 5 is a supported terminal device 5, and may usually be sent by the terminal device 5 in reply to the request from the relay device 4 if the terminal device 5 is a general terminal device.

More specifically, in the illustrative embodiment, at least one of the device name and the vendor name of the terminal device 5 is selected as the determination information. In such a case, if the terminal device 5 is a general terminal device, the terminal device 5 may send the determination information (i.e., at least one of the device name and the vendor name) in reply to the request from the relay device 4. In the meantime, for instance, when the supported terminal devices 5 are devices having a printing function, the terminal information that is originally desired to be obtained is terminal information containing information regarding the printing function.

However, if the relay device 4 sent a request for the terminal information containing information regarding the printing function to a terminal device 5 without the printing function, the relay device 4 might receive no reply from the terminal device 5 and might be kept waiting until the period of timeout passes. Therefore, in S211, the relay device 4 first sends a request for only at least one of the device name and the vendor name to the terminal device 5 that is unknown as to whether it is a supported terminal device 5. Thereby, the relay device 4 attempts to obtain at least one of the device name and the vendor name of the terminal device 5 as minimum information that enables the relay device 4 to determine whether the terminal device 5 is a supported terminal device 5, while avoiding an undesired situation that the relay device 4 might be kept waiting until the period of timeout passes.

After completion of S221, based on the determination information obtained by the unicast, the relay device 4 determines whether the terminal device 5, which has transmitted the determination information, is a supported terminal device 5 (S223). Specifically, in S223, based on at least one of the device name and the vendor name obtained as the determination information, the relay device 4 determines whether the terminal device 5 is a supported terminal device 5, by referring to the list of the terminal devices 5 that should be determined as supported terminal devices 5.

When determining that the terminal device 5, which has transmitted the determination information, is a supported terminal device 5 (S223: Yes), the relay device 4 obtains necessary information by unicast (S225). The information obtained in S225 is the terminal information that is originally desired to be obtained. In S225, the relay device 4 sends a request for the terminal information to the terminal device 5 that is known to be a supported terminal device 5, via unicast communication. Therefore, even though the relay device 4 makes a request for information more specific than the device name or the vendor name, the relay device 4 is more likely to obtain such requested information. Hence, in S225, the relay device 4 is unlikely to be kept waiting until the period of timeout passes, and is enabled to obtain the terminal information without any trouble. Subsequently, the relay device 4 adds the terminal information of the terminal device 5 to the list of the information to be notified to the terminal management device 3 (S227). After completion of S227, the relay device 4 goes to S229. Meanwhile, when determining that the terminal device 5, which has transmitted the determination information, is not a supported terminal device 5 (S223: No), the relay device 4 goes to S229 without executing S225 or S227.

In S229, the relay device 4 determines whether the determination in S223 has been made for all target IP addresses (S229). In S229, the target IP addresses are IP addresses within the IP address range defined by the setting values input in the unicast range entry fields 77 on the input screen 61. For instance, when the supported terminal devices 5 are managed with particular IP addresses assigned thereto, it is possible to efficiently separate the supported terminal devices 5 from the other devices by specifying the range of the IP addresses.

When determining that the determination in S223 has not been made for all the target IP addresses (S229: No), the relay device 4 goes back to S221. Thus, while making a negative determination in S229 (S229: No), the relay device 4 repeatedly performs a process of S221 to S229. When determining that the determination in S223 has been made for all the target IP addresses (S229: Yes) while the process of S221 to S229 is repeatedly performed, the relay device 4 terminates the terminal device search process shown in FIGS. 5A and 5B.

(5) Advantageous Effects

According to the terminal management system 1 as described above, the following effects are achieved. The relay device 4 may obtain the determination information from a terminal device 5 by performing unicast communication with the terminal device 5. The determination information may include at least one of a device name and a vendor name of the terminal device. When the device name and/or the vendor name is requested as the determination information, the terminal device 5 is highly likely to be able to provide such requested determination information to the relay device 4 no matter what type of device the terminal device 5 is, regardless of functions or a model of the terminal device 5. Therefore, the relay device 5 is highly likely to obtain the determination information from the terminal device 5, regardless of whether the terminal device 5 is a supported terminal device 5. Thus, it is possible to quickly determine whether the terminal device 5 is a supported terminal device 5.

When determining that the terminal device 5 is a supported terminal device 5, the relay device 4 obtains terminal information from the supported terminal device 5 by performing unicast communication with the supported terminal device 5. The terminal information is information to be collected by the terminal management device 3. The terminal information may include information that is obtainable from the supported terminal device 5 but is not obtainable from an unsupported terminal device 5. In the illustrative embodiment, however, the relay device 4 obtains the terminal information only from the terminal devices 5 determined to be supported terminal devices 5. Therefore, the relay device 4 never obtains the terminal information from a terminal device 5 determined not to be a supported terminal device 5.

Thus, it is possible to more adequately prevent unnecessary unicast communication from being performed, for instance, compared with when the relay device 4 attempts to obtain the terminal information without separating the supported terminal devices 5 from the unsupported terminal devices. Therefore, it is possible to suppress an unnecessary load on the network that includes the relay device 4 and the terminal devices 5. Further, it is possible to reduce the possibility that the relay device 4 may be kept waiting for replies from the terminal devices 5 and to reduce a time required until obtainment of all necessary terminal information is completed.

In the illustrative embodiment, the relay device 4 may perform unicast communication for each of a plurality of specified IP addresses within the IP address range defined by the setting values input in the unicast range entry fields 77 on the input screen 61. Therefore, for instance, even when there are a large number of terminal devices 5 on the network, it is possible to previously specify IP addresses for some of the large number of terminal devices 5 in such a manner that the relay device 4 obtains the determination information from the some terminal devices 5 corresponding to the previously-specified IP addresses. Thus, it is possible to reduce the number of terminal devices 5 to be processed and to further reduce the time required until obtainment of all the necessary terminal information is completed.

In the illustrative embodiment, when the broadcast communication is specified by the user as a communication method, the relay device 4 obtains the terminal information by the broadcast communication. Further, when the unicast communication is specified by the user as the communication method, the relay device 4 obtains the determination information and the terminal information by the unicast communication. Therefore, the user is allowed to arbitrarily specify and selectively use the unicast communication or the broadcast communication. Thus, for instance, the user is allowed to selectively use the broadcast communication when the broadcast communication is permissible on the network or use the unicast communication when the broadcast communication is impermissible on the network.

In the illustrative embodiment, the terminal management unit 3 may obtain the IP address range set in the unicast range entry fields 77 on the input screen 61. Therefore, the terminal management device 3 may transmit the obtained IP address range to the relay device 4. Thus, the relay device 4 is enabled to obtain the determination information and the terminal information from the terminal devices 5 corresponding to a plurality of IP addresses specified on the terminal management device 3 based on the IP address range.

In the illustrative embodiment, the terminal management unit 3 may obtain the period of timeout set in the timeout setting field 71 on the input screen 61. Therefore, the terminal management device 3 may transmit the set period of timeout to the relay device 4. When the relay device 4 obtains no information even after a lapse of the period of timeout specified by the user, the relay device 4 may abort the obtainment of information.

In the illustrative embodiment, the terminal management device 3 may obtain the upper limit of the number of attempts to search terminal devices 5 as set in the search attempt frequency setting field 73 on the input screen 61. Therefore, the terminal management device 3 may transmit to the relay device 4 the set upper limit of the number of attempts to search terminal devices 5. When the relay device 4 obtains no information even though the relay device 4 repeatedly attempts to obtain information from terminal devices 5 until the number of the attempts reaches the upper limit specified by the user, the relay device 4 may abort the obtainment of information.

Hereinabove, the illustrative embodiment according to aspects of the present disclosure has been described. Aspects of the present disclosure may be practiced by employing conventional materials, methodology and equipment. Accordingly, the details of such materials, equipment and methodology are not set forth herein in detail. In the previous descriptions, numerous specific details are set forth, such as specific materials, structures, chemicals, processes, etc., in order to provide a thorough understanding of the present disclosure. However, it should be recognized that aspects of the present disclosure may be practiced without reapportioning to the details specifically set forth. In other instances, well known processing structures have not been described in detail, in order not to unnecessarily obscure the present disclosure.

Only an exemplary illustrative embodiment of the present disclosure and but a few examples of their versatility are shown and described in the present disclosure. It is to be understood that aspects of the present disclosure are capable of use in various other combinations and environments and are capable of changes or modifications within the scope of the inventive concept as expressed herein. For instance, the following modifications according to aspects of the present disclosure are feasible.

(6) Modifications

In the aforementioned illustrative embodiment, as described above, examples of the terminal devices 5 may include mobile printers, and printers and MFPs that are incompatible with the wireless LAN. However, the terminal devices 5 may not necessarily have the printing function. For instance, the terminal devices 5 may be PCs ("PC" is an abbreviation for "Personal Computer") or smartphones. In another instance, the terminal devices 5 may be industrial equipment or business equipment (e.g., industrial sewing machines, vending machines, business washing machines, medical equipment, etc.) configured to be remotely operated and managed via a network. In yet another instance, the terminal devices 5 may be household appliances (e.g., refrigerators, televisions, air conditioners, washing machines, etc.) configured to be remotely operated and managed via a network.

Further, in the aforementioned illustrative embodiment, the LAN 8 is configured with a combination of both the wired LAN and the wireless LAN. However, the LAN 8 may be configured with only one of the wired LAN and the wireless LAN.

Further, for instance, a plurality of functions achieved by a single element exemplified in the aforementioned illustrative embodiment may be realized by a plurality of elements. A single function achieved by a single element exemplified in the aforementioned illustrative embodiment may be realized by a plurality of elements. A plurality of functions achieved by a plurality of elements exemplified in the aforementioned illustrative embodiment may be realized by a single element. A single function achieved by a plurality of elements exemplified in the aforementioned illustrative embodiment may be realized by a single element. Some of the elements included in the configurations exemplified in the aforementioned illustrative embodiment may be omitted.

(7) Supplemental

As is apparent from the aforementioned illustrative embodiment, the relay processing program 412*b*, each relay device 4, the terminal management device 3, and the terminal management system 1 according to aspects of the present disclosure may further be configured as follows.

According to aspects of the present disclosure, the relay processing program 412*b* may be configured to, when executed by the CPU 411 of a relay device 4, cause the relay device 4 to perform a first obtaining process, a management target determining process, and a second obtaining process. In the first obtaining process, the relay device 4 may perform unicast communication with each of one or more terminal devices 5, thereby obtaining, as the determination information, at least one of the device name and the vendor name of each terminal device 5. In the management target determining process, the relay device 4 may determine whether each terminal device 5 is a supported terminal device 5 to be supported by the terminal management device 3, based on the obtained determination information. In the second obtaining process, the relay device 4 may perform unicast communication with one or more individual terminal devices 5 each of which is determined to be the supported terminal device 5 in the management target determining process, thereby obtaining terminal information from each supported terminal device 5.

The relay processing program 412*b* may further be configured to, when executed, cause the relay device 4 to perform the first obtaining process by performing the unicast communication with each of a plurality of terminal devices 5 using a plurality of IP addresses assigned to the plurality of IP addresses, based on particular information for specifying the plurality of IP addresses.

Thereby, for instance, even when there are a large number of terminal devices 5 on the network, it is possible to previously specify IP addresses for some of the large number of terminal devices 5 in such a manner that the relay device 4 obtains the determination information from each of the some terminal devices 5 corresponding to the previously-specified IP addresses. Thereby, it is possible to reduce the number of terminal devices 5 to be processed and to further reduce the time required until obtainment of all the necessary terminal information is completed.

The relay processing program 412b may further be configured to, when executed, cause the relay device 4 to perform a communication method determining process and a third obtaining process. In the communication method determining process, the relay device 4 may determine whether a communication method specified by the user is unicast communication or broadcast communication. In the third obtaining process, when determining that the communication method specified by the user is broadcast communication, the relay device 4 may obtain the terminal information from the one or more terminal devices 5 by performing the broadcast communication with the one or more terminal devices 5. When determining that the communication method specified by the user is unicast communication, the relay device 4 may perform the first obtaining process, the management target determining process, and the second obtaining process.

Thus, when the relay processing program 412b configured as above is executed by the CPU 411, the relay device 4 performs the third obtaining process in a case where the communication method specified by the user is broadcast communication, and performs the first obtaining process, the management target determining process, and the second obtaining process in a case where the communication method specified by the user is unicast communication. Therefore, the user is allowed to arbitrarily specify and selectively use the unicast communication or the broadcast communication. Thus, for instance, the user may selectively use the broadcast communication when the broadcast communication is permissible on the network or use the unicast communication when the broadcast communication is impermissible on the network.

According to aspects of the present disclosure, a relay device 4 may be configured to perform the first obtaining process, the management target determining process, and the second obtaining process. The relay device 4 may further be configured to perform the communication method determining process and the third obtaining process.

According to aspects of the present disclosure, the terminal management processing program 312b may be configured to, when executed by the CPU 311, cause the terminal management device 3 to perform a user interface providing process and an information obtaining process. In the user interface providing process, the terminal management device 3 may provide a user interface configured to receive input of particular information for specifying a plurality of IP addresses assigned to a plurality of terminal devices. In the information obtaining process, the terminal management device 3 may obtain the particular information for specifying the plurality of IP addresses as input via the user interface.

When the terminal management processing program 312b is configured as above, the relay device 4 may be configured to perform the first obtaining process, the management target determining process, and the second obtaining process when the communication method specified by the user is unicast communication. Further, in the user interface providing process, the terminal management device 3 may provide a user interface configured to receive an input to specify one of the unicast communication and the broadcast communication as the communication method.

When the relay device 4 obtains no information from the terminal devices 5 even after a lapse of a period of timeout specified by the user, the relay device 4 may abort the obtainment of information. The terminal management processing program 312b may further be configured to, when executed, cause the terminal management device 3 to provide, in the user interface providing process, a user interface configured to receive an input to specify the period of timeout.

When the relay device 4 obtains no information even though the relay device 4 repeatedly attempts to obtain information from the terminal devices 5 until the number of the attempts reaches an upper limit specified by the user, the relay device 4 may abort the obtainment of information. The terminal management processing program 312b may further be configured to, when executed, cause the terminal management device 3 to provide, in the user interface providing process, a user interface configured to receive an input to specify the upper limit of the number of the attempts.

The terminal management system 1 may be configured such that the terminal management device 3 is communicable with each relay device 4 through a firewall.

The following shows examples of associations between elements exemplified in the aforementioned illustrative embodiment and modifications and elements according to aspects of the present disclosure. The terminal management system 1 may be an example of "a system" according to aspects of the present disclosure. A relay device 4 included in the terminal management system 1 may be an example of "a relay device" according to aspects of the present disclosure. Each terminal device 5 under the control of the relay device 4 may be included in "one or more terminal devices" according to aspects of the present disclosure. The terminal management device 3 may be an example of "a terminal management device" according to aspects of the present disclosure. The CPU 411 may be an example of "a processor" of the relay device according to aspects of the present disclosure. The memory 412 may be an example of "a memory" of the relay device according to aspects of the present disclosure. The controller 41 may be an example of "a controller" of the relay device according to aspects of the present disclosure. The communication I/F 42 may be an example of "a communication interface" of the relay device according to aspects of the present disclosure. The relay processing program 412b may be an example of "computer-readable program instructions" executable by the processor of the relay device according to aspects of the present disclosure. The CPU 311 may be an example of "a processor" of the terminal management device according to aspects of the present disclosure. The memory 312 may be an example of "a memory" of the terminal management device according to aspects of the present disclosure. The controller 31 may be an example of "a controller" of the terminal management device according to aspects of the present disclosure. The communication I/F 32 may be an example of "a communication interface" of the terminal management device according to aspects of the present disclosure. The terminal management processing program 312b may be an example of "computer-readable program instructions" executable by the processor of the terminal management device according to aspects of the present disclosure. The wireless LAN router 8A may serve as "a firewall" according to aspects of the present disclosure. Examples of "user interfaces" provided by the terminal management device according to aspects of the present disclosure may include the user interfaces on the input screen 61 (see FIG. 4) such as the unicast range entry fields 77, the search mode setting field 69, the timeout setting field 71, and the search attempt frequency setting field 73.

What is claimed is:

1. A non-transitory computer-readable medium storing computer-readable program instructions executable by a processor of a relay device communicable with a terminal management device and one or more terminal devices, the program instructions being configured to, when executed by the processor, cause the relay device to:
    determine whether to search for a supported terminal device to be managed by the terminal management device from among the one or more terminal devices in a unicast communication mode or another communication mode;
    in response to determining to search for the supported terminal device in the unicast communication mode, perform unicast communication with each of the one or more terminal devices, thereby obtaining a device name or a vendor name or both a device name and a vendor name of each terminal device as determination information;
    determine, based on the determination information obtained via the unicast communication, whether each of the one or more terminal devices is the supported terminal device or an unsupported terminal device not to be managed by the terminal management device; and
    perform unicast communication with one or more individual terminal devices each determined to be the supported terminal device, thereby obtaining terminal information from each supported terminal device, the terminal information including information that is obtainable from the supported terminal device but is not obtainable from the unsupported terminal device, the terminal information regarding each supported terminal device being collected by the terminal management device via the relay device.

2. The non-transitory computer-readable medium according to claim 1,
    wherein the program instructions are further configured to, when executed, cause the relay device to obtain the determination information by performing unicast communication with each of a plurality of terminal devices using a plurality of IP addresses assigned to the plurality of terminal devices, based on particular information for specifying the plurality of IP addresses.

3. The non-transitory computer-readable medium according to claim 1,
    wherein the program instructions are further configured to, when executed, cause the relay device to:
        in response to determining to search for the supported terminal device in another communication mode, obtain the terminal information by performing communication with the one or more terminal devices via the another communication mode.

4. The non-transitory computer-readable medium according to claim 1,
    wherein the terminal management device and the relay device are configured to communicate with each other through a firewall.

5. A non-transitory computer-readable medium storing computer-readable program instructions executable by a processor of a terminal management device communicable with a relay device, the program instructions being configured to, when executed by the processor, cause the terminal management device to:
    provide a user interface configured to receive an input to specify a unicast communication mode or another communication mode as a communication method for the relay device to search for one or more supported terminal devices to be managed by the terminal management device;
    provide another user interface configured to receive an input of particular information for specifying a plurality of IP addresses assigned to a plurality of terminal devices; and
    obtain, via the another user interface, the particular information for specifying the plurality of IP addresses,
    wherein the relay device is configured to:
        determine whether the unicast communication mode or the another communication mode has been specified via the user interface;
        in response to determining the unicast communication mode has been specified to search for one or more supported terminal devices, perform unicast communication with each of the plurality of terminal devices using the plurality of IP addresses specified by the particular information, thereby obtaining a device name or a vendor name or both a device name and a vendor name of each terminal device as determination information;
        determine, based on the determination information obtained via the unicast communication, whether each of the plurality of terminal devices is a supported terminal device or an unsupported terminal device not to be managed by the terminal management device; and
        perform unicast communication with one or more individual terminal devices each determined to be the supported terminal device, thereby obtaining terminal information from each supported terminal device, the terminal information including information that is obtainable from the supported terminal device but is not obtainable from the unsupported terminal device, the terminal information regarding each supported terminal device being collected by the terminal management device via the relay device.

6. The non-transitory computer-readable medium according to claim 5,
    wherein the relay device is further configured to:
        in response to determining the another communication mode has been specified to search for one or more supported terminal devices obtain the terminal information by performing communication with the plurality of terminal devices via the another communication mode.

7. The non-transitory computer-readable medium according to claim 5,
    wherein the program instructions are further configured to, when executed, cause the terminal management device to provide second another user interface configured to receive an input to specify a period of timeout for the relay device to attempt to obtain information, and
    wherein the relay device is further configured to abort obtainment of the information when the relay device does not obtain the information even after a lapse of the specified period of timeout.

8. The non-transitory computer-readable medium according to claim 5,
wherein the program instructions are further configured to, when executed, cause the terminal management device to provide second another user interface configured to receive an input to specify an upper limit of a count of attempts for the relay device to obtain information, and
wherein the relay device is further configured to abort obtainment of the information when the relay device does not obtain the information even though the relay device repeatedly attempts to obtain the information until the count of the attempts reaches the specified upper limit.

9. The non-transitory computer-readable medium according to claim 5,
wherein the terminal management device and the relay device are configured to communicate with each other through a firewall.

10. A relay device comprising:
a communication interface configured to communicate with a terminal management device and one or more terminal devices; and
a controller configured to:
determine whether to search for a supported terminal device to be managed by the terminal management device from among the one or more terminal devices in a unicast communication mode or another communication mode;
in response to determining to search for the supported terminal device in the unicast communication mode, perform unicast communication with each of the one or more terminal devices, thereby obtaining a device name or a vendor name or both a device name and a vendor name of each terminal device as determination information;
determine, based on the determination information obtained via the unicast communication, whether each of the one or more terminal devices is the supported terminal device or an unsupported terminal device not to be managed by the terminal management device; and
perform unicast communication with one or more individual terminal devices each determined to be the supported terminal device, thereby obtaining terminal information from each supported terminal device, the terminal information including information that is obtainable from the supported terminal device but is not obtainable from the unsupported terminal device, the terminal information regarding each supported terminal device being collected by the terminal management device via the relay device.

11. The relay device according to claim 10,
wherein the relay device is configured to communicate, via the communication interface, with the terminal management device through a firewall.

12. The relay device according to claim 10,
wherein the controller comprises:
a processor; and
a memory storing computer-readable program instructions configured to, when executed by the processor, cause the controller to:
determine whether to search for a supported terminal device to be managed by the terminal management device from among the one or more terminal devices in a unicast communication mode or another communication mode;
in response to determining to search for the supported terminal device in the unicast communication mode, obtain the determination information by performing unicast communication with each of the one or more terminal devices;
determine, based on the determination information obtained via the unicast communication, whether each of the one or more terminal devices is the supported terminal device or the unsupported terminal device; and
perform unicast communication with the one or more individual terminal devices each determined to be the supported terminal device, thereby obtaining the terminal information from each supported terminal device.

13. A terminal management device comprising:
a communication interface configured to communicate with a relay device; and
a controller configured to:
provide a user interface configured to receive an input to specify a unicast communication mode or another communication mode as a communication method for the relay device to search for one or more supported terminal devices to be managed by the terminal management device;
provide another user interface configured to receive an input of particular information for specifying a plurality of IP addresses assigned to a plurality of terminal devices; and
obtain, via the another user interface, the particular information for specifying the plurality of IP addresses,
wherein the relay device is configured to:
determine whether the unicast communication mode or the another communication mode has been specified via the user interface;
in response to determining the unicast communication mode has been specified to search for one or more supported terminal devices, perform unicast communication with each of the plurality of terminal devices using the plurality of IP addresses specified by the particular information, thereby obtaining a device name or a vendor name or both a device name and vendor name of each terminal device as determination information;
determine, based on the determination information obtained via the unicast communication, whether each of the plurality of terminal devices is a supported terminal device or an unsupported terminal device not to be managed by the terminal management device; and
perform unicast communication with one or more individual terminal devices each determined to be the supported terminal device, thereby obtaining terminal information from each supported terminal device, the terminal information including information that is obtainable from the supported terminal device but is not obtainable from the unsupported terminal device, the terminal information regarding each supported terminal device being collected by the terminal management device via the relay device.

14. The terminal management device according to claim 13,
wherein the terminal management device is configured to communicate, via the communication interface, with the relay device through a firewall.

15. The terminal management device according to claim 13,
  wherein the controller comprises:
    a processor; and
    a memory storing computer-readable program instructions configured to, when executed by the processor, cause the controller to:
      provide the user interface configured to receive the input to specify a unicast communication mode or another communication mode as the communication method for the relay device to search for one or more supported terminal devices to be managed by the terminal management device;
      provide the another user interface configured to receive the input of the particular information for specifying the plurality of IP addresses; and
      obtain the particular information via the another user interface.

16. A system comprising:
  one or more terminal devices;
  a terminal management device; and
  a relay device comprising:
    a communication interface configured to communicate with the terminal management device and the one or more terminal devices; and
    a controller configured to:
      determine whether to search for a supported terminal device to be managed by the terminal management device from among the one or more terminal devices in a unicast communication mode or another communication mode;
      in response to determining to search for the supported terminal device in the unicast communication mode, perform unicast communication with each of the one or more terminal devices, thereby obtaining a device name or a vendor name or both a device name and a vendor name of each terminal device as determination information;
      determine, based on the determination information obtained via the unicast communication, whether each of the one or more terminal devices is the supported terminal device- or an unsupported terminal device not to be managed by the terminal management device; and
      perform unicast communication with one or more individual terminal devices each determined to be the supported terminal device, thereby obtaining terminal information from each supported terminal device, the terminal information including information that is obtainable from the supported terminal device but is not obtainable from the unsupported terminal device, the terminal information regarding each supported terminal device being collected by the terminal management device via the relay device.

* * * * *

UNITED STATES PATENT AND TRADEMARK OFFICE
CERTIFICATE OF CORRECTION

PATENT NO. : 11,533,230 B2
APPLICATION NO. : 17/036416
DATED : December 20, 2022
INVENTOR(S) : Takashi Nishizaki It is certified that error appears in the above-identified patent and that said Letters Patent is hereby corrected as shown below:

In the Claims

Column 19, Claim 3, Line 56 should read:
terminal device in the another communication mode, Signed and Sealed this
Fourth Day of July, 2023

Katherine Kelly Vidal
*Director of the United States Patent and Trademark Office*